US010473268B2

(12) United States Patent
Okuno et al.

(10) Patent No.: US 10,473,268 B2
(45) Date of Patent: Nov. 12, 2019

(54) COMPRESSOR UNIT AND GAS SUPPLY APPARATUS

(71) Applicant: Kobe Steel, Ltd., Kobe-shi (JP)

(72) Inventors: Takashi Okuno, Takasago (JP);
Koichiro Hashimoto, Takasago (JP);
Kenji Nagura, Takasago (JP)

(73) Assignee: Kobe Steel, Ltd., Kobe-shi (JP)

(*) Notice: Subject to any disclaimer, the term of this patent is extended or adjusted under 35 U.S.C. 154(b) by 603 days.

(21) Appl. No.: 15/042,879

(22) Filed: Feb. 12, 2016

(65) Prior Publication Data
US 2016/0290562 A1  Oct. 6, 2016

(30) Foreign Application Priority Data

Apr. 2, 2015 (JP) ................... 2015-075968

(51) Int. Cl.
*F17C 5/06* (2006.01)
*F04B 35/04* (2006.01)
(Continued)

(52) U.S. Cl.
CPC .............. *F17C 5/06* (2013.01); *F04B 35/04* (2013.01); *F04B 41/02* (2013.01); *F04B 49/06* (2013.01);
(Continued)

(58) Field of Classification Search
CPC .......... F04B 35/04; F04B 41/02; F04B 49/06; F04B 49/08; F04B 49/20; F04B 49/065;
(Continued)

(56) References Cited

U.S. PATENT DOCUMENTS 4,333,042 A * 6/1982 Kawada ................. H02P 27/08
318/801
4,713,596 A * 12/1987 Bose ....................... H02P 21/22
318/561
(Continued)

FOREIGN PATENT DOCUMENTS

CN   103161728 A   6/2013
CN   103492785 A   1/2014
(Continued)

OTHER PUBLICATIONS

Extended European Search Report dated Aug. 16, 2016 in Patent Application No. 16155438.1.

*Primary Examiner* — Patrick Hamo
*Assistant Examiner* — Joseph S. Herrmann
(74) *Attorney, Agent, or Firm* — Oblon, McClelland, Maier & Neustadt, L.L.P.

(57) ABSTRACT

A gas supply apparatus includes; a compressor unit including a compression section compressing hydrogen gas and storing pressure accumulators with the compressed hydrogen gas and a drive portion including an electric motor as drive source and driving the compression section; and a control unit controlling the electric motor. The electric motor has output characteristics where rated torque can be maintained against rotational speed changes in a standard rotation region, rotation region at or below standard speed, and output torque decreases from the rated torque as electric motor rotational speed increases in an overspeed region, rotation region above the standard speed. The control unit performs, in at least part of a storage process where the compression section stores the pressure accumulators with the hydrogen gas until set pressure is reached, overspeed operation control for allowing driving of the electric motor in the overspeed region.

7 Claims, 5 Drawing Sheets

(51) Int. Cl.
*F04B 41/02* (2006.01)
*F04B 49/06* (2006.01)
*F04B 49/20* (2006.01)
*F04B 49/08* (2006.01)
*F17C 1/00* (2006.01)
*F04D 25/06* (2006.01)

(52) U.S. Cl.
CPC .............. *F04B 49/08* (2013.01); *F04B 49/20* (2013.01); *F17C 1/00* (2013.01); F04B 2203/0207 (2013.01); F04B 2203/0209 (2013.01); F04B 2205/05 (2013.01); F04D 25/06 (2013.01); F05D 2270/335 (2013.01); F17C 2201/056 (2013.01); F17C 2205/0146 (2013.01); F17C 2221/012 (2013.01); F17C 2223/0123 (2013.01); F17C 2223/036 (2013.01); F17C 2227/0157 (2013.01); F17C 2227/0164 (2013.01); F17C 2227/0344 (2013.01); F17C 2227/0348 (2013.01); F17C 2227/0355 (2013.01); F17C 2227/043 (2013.01); F17C 2250/032 (2013.01); F17C 2250/043 (2013.01); F17C 2265/065 (2013.01); F17C 2270/0184 (2013.01); Y02E 60/321 (2013.01); Y02E 70/30 (2013.01)

(58) Field of Classification Search
CPC ...... F04B 2203/0207; F04B 2203/0209; F04B 2205/05; F04D 25/06; F05D 2270/335; F17C 1/00; F17C 1/005; F17C 5/06; F17C 2201/056; F17C 2205/0146; F17C 2221/012; F17C 2223/0123; F17C 2223/036; F17C 2227/0157; F17C 2227/0164; F17C 2227/0344; F17C 2227/0348; F17C 2227/0355; F17C 2227/043; F17C 2250/032; F17C 2250/043; F17C 2265/065; F17C 2270/0184; Y02E 60/321; Y02E 70/30
See application file for complete search history.

(56) References Cited

U.S. PATENT DOCUMENTS

| | | | |
|---|---|---|---|
| 6,605,912 B1 * | 8/2003 | Bharadwaj | H02P 21/0089 318/400.02 |
| 9,097,255 B2 * | 8/2015 | Kobayashi | F04C 23/001 |
| 9,410,552 B2 * | 8/2016 | Pierson | F04D 25/08 |
| 9,435,488 B2 * | 9/2016 | Nagura | F17C 13/026 |
| 2006/0130504 A1 | 6/2006 | Agrawal et al. | |
| 2012/0125480 A1 * | 5/2012 | Inagi | F17C 5/06 141/4 |
| 2013/0088213 A1 | 4/2013 | Pierson | |
| 2013/0156623 A1 | 6/2013 | Bonnefoi et al. | |
| 2014/0102587 A1 * | 4/2014 | Nagura | H01M 8/04208 141/69 |
| 2014/0196814 A1 | 7/2014 | Nagura et al. | |
| 2014/0332114 A1 * | 11/2014 | Nagura | F17C 13/025 141/4 |

FOREIGN PATENT DOCUMENTS

| | | |
|---|---|---|
| DE | 10 2013 003 513 A1 | 9/2014 |
| EP | 1 596 122 A2 | 11/2005 |
| JP | 2007-231816 A | 9/2007 |
| JP | 2013-15155 | 1/2013 |
| KR | 10-2014-0088224 A | 7/2014 |

\* cited by examiner

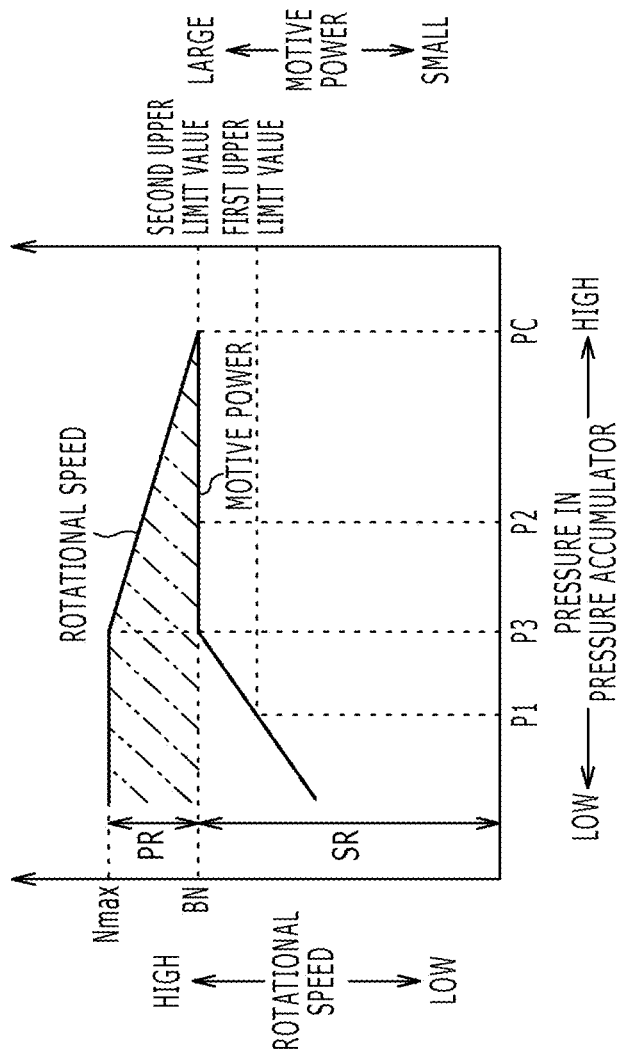

COMPRESSOR UNIT AND GAS SUPPLY APPARATUS

BACKGROUND OF THE INVENTION

Field of the Invention

The present invention relates to a compressor unit and a gas supply apparatus.

Description of the Related Art

Hitherto, there have been concerns such as global warming and aerial pollution caused by carbon dioxide and nitrogen oxide contained in an exhaust gas of a gasoline powered vehicle. For this reason, instead of a gasoline powered vehicle, a vehicle that does not exhaust carbon dioxide and nitrogen oxide has been desired. In this regard, development of a vehicle (fuel cell vehicle) in which hydrogen and oxygen in the air are made to be reacted with each other in a fuel cell, thereby generating electricity to drive an electric motor has been recently advanced.

In the meantime, the fuel cell vehicle is largely classified into a type in which hydrogen is charged from a hydrogen station and a type in which a fuel other than hydrogen is charged and an in-vehicle reformer produces hydrogen. Meanwhile, the type in which hydrogen is charged from a hydrogen station is considered to be more advantageous in view of effects of reducing carbon dioxide, and the like.

For example, JP 2013-15155 A discloses an example of a configuration of a hydrogen station. The hydrogen station in JP 2013-15155 A includes a low-pressure stage compressor, a high-pressure stage compressor, and an intermediate pressure accumulator disposed between the low-pressure stage compressor and the high-pressure stage compressor. In this hydrogen station, the low-pressure stage compressor compresses hydrogen supplied from a hydrogen supply source and supplies the same to the intermediate pressure accumulator. Then, the hydrogen in the intermediate pressure accumulator is supplied to the high-pressure stage compressor, and the hydrogen further compressed in the high-pressure stage compressor upplied to a filling nozzle connected to an in-vehicle hydrogen tank, whereby the in-vehicle hydrogen tank in a fuel cell vehicle is filled with the hydrogen through the filling nozzle.

SUMMARY OF THE INVENTION

In the meantime, a so-called constant torque motor that is allowed to perform driving under a constant torque control has been investigated for use as an electric motor that drives a compression section of a compressor employed for a hydrogen station. According to an output characteristic of the constant torque motor, a rated torque is maintained in a standard rotation region at or below a predetermined rotational speed (hereinafter referred to as "standard speed") as illustrated in FIG. 6A.

In this manner, when the constant torque motor having the above output characteristic is employed as the electric motor of the compressor of the hydrogen station, a method in which the constant torque motor drives the compression section while maintaining the standard speed may be employed. For example, when a low-pressure stage compressor employs this drive method, in this drive method, a pressure of hydrogen discharged from a compression section, namely a discharge pressure, becomes high as a pressure in an intermediate pressure accumulator becomes high, and as the discharge pressure becomes high, a torque required for the constant torque motor becomes high. Consequently, as illustrated in FIG. 6B, as the pressure in the intermediate pressure accumulator becomes high, a motive power of the constant torque motor becomes large. Note that, in FIG. 6B, when a pressure in which the intermediate pressure accumulator is sufficiently filled with hydrogen, namely a set pressure, is achieved, the motive power of the constant torque motor reaches an upper limit value.

However, as illustrated by the shaded portion in FIG. 6B, in the above drive method, when the pressure in the intermediate pressure accumulator is low, in other words, when the discharge pressure in the compression section is low, the motive power of the constant torque motor is spared, and a performance of the constant torque motor is not sufficiently carried out. In other words, when the torque required for the constant torque motor is lower than the rated torque based on the discharge pressure in the compression section, the motive power of the constant torque motor is less than the upper limit value thereof even though a rotational speed of the constant torque motor is the standard speed. Meanwhile, when the rotational speed of the constant torque motor is below the standard speed even though the constant torque motor performs driving at the rated torque, the motive power of the constant torque motor is less than the upper limit value thereof. Thus, a method of using the constant torque motor is still to be improved.

A main object of the present invention is to efficiently use a motive power of an electric motor.

A compressor unit for solving this problem includes: a compression section for compressing a gas and storing a pressure accumulator with the compressed gas; a drive portion that includes an electric motor as a drive source and drives the compression section; and a control unit for controlling the electric motor in which the electric motor has an output characteristic in which a rated torque can be maintained against a change of a rotational speed in a standard rotation region that is a rotation region at or below a standard speed that is a maximum speed in which rotation can be made at the rated torque, and an output torque decreases from the rated torque according as the rotational speed of the electric motor increases in an overspeed region that is a rotation region continuous from the standard rotation region and above the standard speed, and the control unit performs, in at least a part of a storage process in which the compression section stores with the gas until a pressure in the pressure accumulator reaches a predetermined pressure, an overspeed operation control for allowing the electric motor to perform driving in the overspeed region.

According to this compressor unit, the electric motor is allowed to perform driving in the overspeed region so that, within a range of a motive power that can be driven by the electric motor, an available motive power range can be further enlarged in comparison with a case in which the electric motor allowed to perform driving at the standard speed. For example, while the pressure in the pressure accumulator is low, the motive power in which the electric motor is allowed to perform driving at the rotational speed in the overspeed region becomes large in comparison with a case in which the electric motor is allowed to perform driving at the standard speed. Thus, the electric motor is allowed to perform driving with such large motive power as to be unavailable when the electric motor is allowed to perform driving at the standard speed so that the motive power of the electric motor can be efficiently used.

Further, in the compressor unit, preferably, the control unit performs, in at least a part of a period in which the overspeed operation control is performed, a speed change control for decreasing the rotational speed of the electric motor as the pressure in the pressure accumulator increases.

A torque required for the electric motor becomes high according as the pressure in the pressure accumulator increases. In this regard, according to this compressor unit, in at least a part of a period in which the overspeed operation control is performed, the rotational speed of the electric motor is decreased according as the pressure in the pressure accumulator increases so that, even though the pressure in the pressure accumulator increases, the electric motor can be allowed to perform driving in the overspeed region within the range of the motive power that can be driven by the electric motor. Accordingly, a frequency in which the electric motor is allowed to perform driving in the overspeed region increases.

Further, in the compressor unit, preferably, the control unit performs a control for allowing the electric motor to perform driving at a maximum speed in the overspeed region before performing the speed change control.

According to this compressor unit, in an environment in which the maximum speed of the electric motor in the overspeed region can be maintained, the electric motor is allowed to perform driving at the maximum speed thereof so that the motive power of the electric motor becomes larger in comparison with a case in which the electric motor is allowed to perform driving below the maximum speed in the overspeed region, and time for the storage process can be shortened.

Further, in the compressor unit, preferably, when the pressure in the pressure accumulator reaches a threshold value or greater, the control unit performs switching from the overspeed operation control to a low speed operation control for allowing the electric motor to perform driving at a speed lower than the standard speed.

According to this compressor unit, even when a motor providing a small motive power is employed as the electric motor, a processing amount equal to that by a motor providing a large motive power can be ensured. Moreover, employing a motor providing a small motive power allows miniaturization and reduction of a cost of the compressor unit to be designed. Note that a torque required for driving of the electric motor that drives the compression section increases according as the pressure in the pressure accumulator increases. The threshold value herein refers to the pressure in the pressure accumulator when the torque required for driving of the electric motor reaches the rated torque of the electric motor.

Further, in the compressor unit, preferably, the control unit performs the overspeed operation control over the entirety of the storage process.

According to this compressor unit, the rotational speed of the electric motor is higher in comparison with a case in which the electric motor is allowed to perform driving at the standard speed so that, if the pressures in the pressure accumulators are identical to each other, the motive power is larger in comparison with the case in which the electric motor is allowed to perform driving at the standard speed, and time for the storage process can be shortened.

A gas supply apparatus for solving this problem supplies a gas to a filling facility for filling a tank-equipped apparatus with the gas, and includes the above compressor unit and the pressure accumulator for storing the gas discharged from the compressor unit.

According to this gas supply apparatus, effects similar to those according to the above compressor unit can be obtained.

Further, this gas supply apparatus preferably includes a precool system for cooling the gas that is about to flow from the pressure accumulator into the filling facility or has flown thereinto.

The above invention enables an efficient use of a motive power of an electric motor.

BRIEF DESCRIPTION OF THE DRAWINGS

FIG. 5 is a graph illustrating a relationship among a rotational speed, a pressure in the pressure accumulator, and a motive power with respect to the electric motor of the compressor unit according to a second embodiment.

DESCRIPTION OF THE PREFERRED EMBODIMENTS (First Embodiment)

Figure 1:
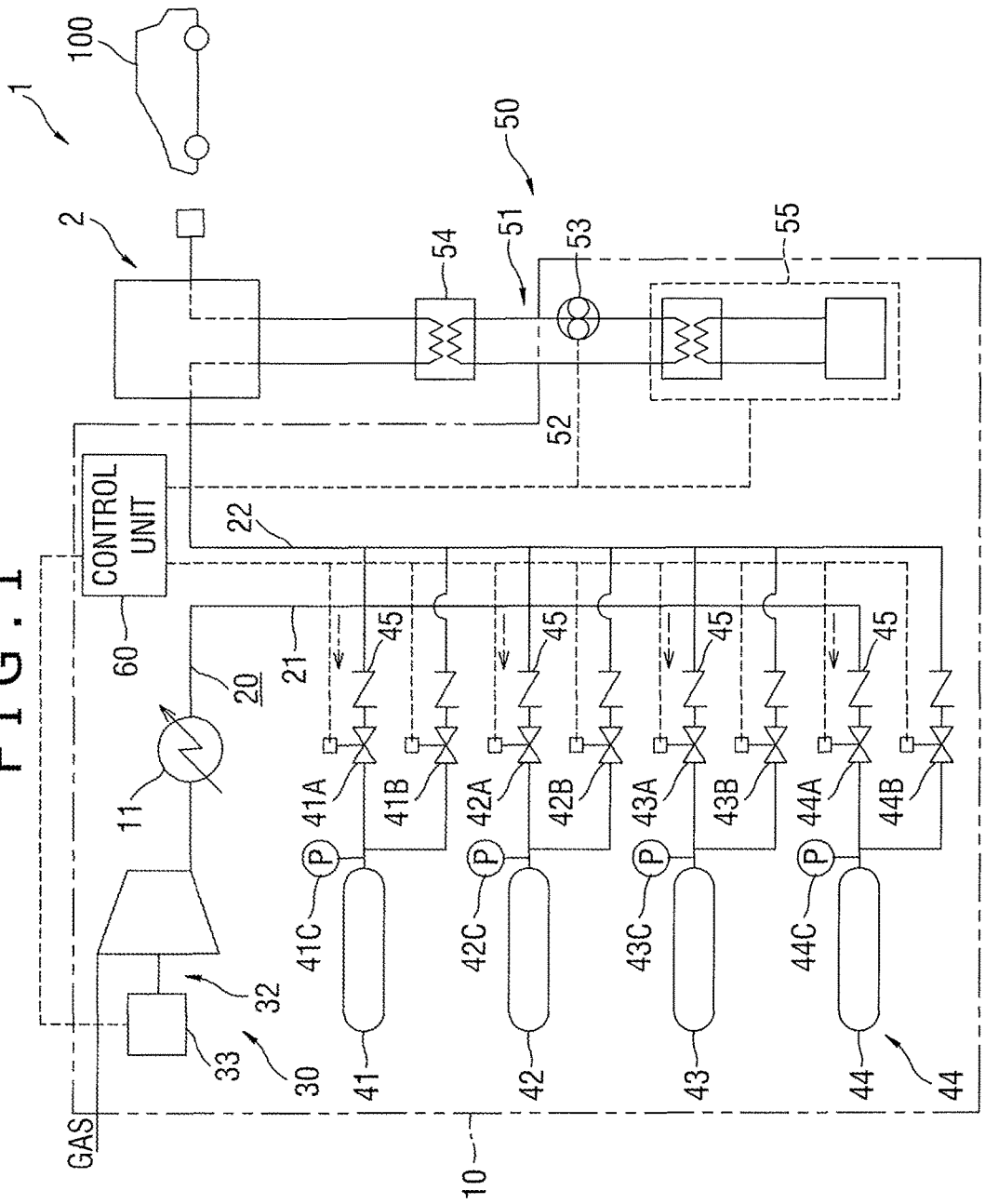
FIG. 1 is a schematic diagram illustrating a configuration of a hydrogen station including a compressor unit according to a first embodiment.

A first embodiment of a gas supply apparatus including a compressor unit will be described with reference to the accompanying drawings. FIG. 1 illustrates a configuration of a hydrogen station 1 including a gas supply apparatus 10. Note that constituent parts of the hydrogen station 1 that are provided with reference numerals in the below description with reference to FIGS. 2-4 denote corresponding constituent parts of the hydrogen station 1 in FIG. 1.

As illustrated in FIG. 1, the hydrogen station 1 is a facility for filling a vehicle 100 as a tank-equipped apparatus, such as a fuel cell vehicle, with a hydrogen gas. The hydrogen station 1 includes a dispenser 2 that is an example of a filling facility for filling the vehicle 100 with the hydrogen gas, and a gas supply apparatus 10 for supplying the dispenser 2 with the hydrogen gas.

The gas supply apparatus 10 is configured such that a compressor unit 30, a gas cooling portion 11, and a pressure accumulator unit 40 are connected to one another through a gas flow channel 20, and the hydrogen gas can flow through each device. Further, the gas supply apparatus 10 includes a precool system 50 for cooling the hydrogen gas that has flown into the dispenser 2. The gas flow channel 20 includes a first flow channel 21 through which the compressor unit 30 supplies the pressure accumulator unit 40 with the hydrogen gas and a second flow channel 22 through which the hydrogen gas is supplied from the pressure accumulator unit 40 to the dispenser 2.

The compressor unit 30 is supplied with the hydrogen gas at a low pressure, such as 0.6 MPa, from an unillustrated hydrogen tank. The compressor unit 30 includes a compression section 31 including a cylinder and a piston, both of which are unillustrated, an electric motor 33 that serves as a drive source for the piston of the compression section 31, and a drive portion 32 including a pulley mechanism that is a reduction drive for reducing rotation of the electric motor 33 and transmitting the same to the piston. The piston is reciprocally driven in the cylinder by rotation of the electric motor 33, whereby the compressor unit 30 compresses the hydrogen gas in the cylinder and discharges the same through the first flow channel 21 to the gas cooling portion 11. Note that, in this embodiment, the compression section 31 performs a five-stage compression operation.

The gas cooling portion 11 cools the hydrogen gas that has been compressed to have an elevated temperature. The gas cooling portion 11 allows the hydrogen gas to flow through, for example, a micro channel heat exchanger through which cooling water flows, thereby performing heat exchange between the hydrogen gas and the cooling water.

The pressure accumulator unit 40 is supplied through the first flow channel 21 with the hydrogen gas that has been cooled by the gas cooling portion 11. The pressure accumulator unit 40 includes four pressure accumulators 41-44 that store the hydrogen gas. The first flow channel 21 is connected to the pressure accumulator 41 while branching. The branching first flow channel 21 is provided with a check valve 45, an inflow side opening/closing valve 41A, and a pressure sensor 41C in an order from an upstream side toward a downstream side of a flowing direction of the hydrogen gas.

Moreover, the pressure accumulator unit 40 can supply the dispenser 2 through the second flow channel 22 with the hydrogen gas stored in each of the pressure accumulators 41-44. The second flow channel 22 is connected to the branching first flow channel 21 between the pressure sensor 41C and the inflow side opening/closing valve 41A while branching. The branching second flow channel 22 is provided with an outflow side opening/closing valve 41B and the check valve 45 in an order from the upstream side toward the downstream side of the flowing direction of the hydrogen gas. Note that, similarly, also with respect to the pressure accumulators 42-44, the corresponding branching first flow channels 21 are provided with the check valve 45 each, inflow side opening/closing valves 42A, 43A, 44A, respectively, and pressure sensors 42C, 43C, 44C, respectively, and the corresponding branching second flow channels 22 are provided with outflow side opening/closing valves 42B, 43B, 44B, respectively, and the check valve 45 each.

The precool system 50 is an apparatus that cools the hydrogen gas supplied from the pressure accumulator unit 40 through the second flow channel 22 to the dispenser 2. The precool system 50 includes a brine circuit 51 for performing heat exchange between the hydrogen gas supplied to the dispenser 2 and a brine, and a refrigerator 55 that performs heat exchange between the brine that flows through the brine circuit 51 and a cooling medium. The brine circuit 51 allows the brine to flow through a precool heat exchanger 54 by a brine pump 53 for allowing the brine in a brine flow channel 52 to circulate, thereby performing heat exchange between this brine and the hydrogen gas. Then, the brine that has been heated due to heat exchange with the hydrogen gas is cooled by the cooling medium of the refrigerator 55. The refrigerator 55 is configured to be a so-called heat pump cycle in which the cooling medium that has been evaporated due to heat exchange with the brine is compressed by a compressor and cooled by a fan to be condensed, and then expanded by an expansion valve and again subjected to heat exchange with the brine.

In the hydrogen station 1 having such a configuration, first, the hydrogen gas compressed by the compressor unit 30 is stored in the pressure accumulators 41-44 while cooled by the gas cooling portion 11.

Then, when the vehicle 100 is brought in the hydrogen station 1 and filled with the hydrogen gas, any of the pressure accumulators 41-44 supplies the dispenser 2 with the hydrogen gas on the basis of a predetermined control program, and the dispenser 2 fills the vehicle 100 with the hydrogen gas in accordance with a predetermined filling protocol.

Moreover, the gas supply apparatus 10 includes a control unit 60 that controls the flow of the hydrogen gas. The control unit 60 includes a CPU, a ROM, a RAM, and the like, and controls operations of the electric motor 33 of the compressor unit 30, the inflow side opening/closing valves 41A-44A and the outflow side opening/closing valves 41B-44B of the pressure accumulator unit 40, and the brine pump 53 and the refrigerator 55 of the precool system 50 on the basis of the control program stored in the ROM or the RAM. Moreover, detection pressures of the hydrogen gas in the branching first flow channels 21 that have been detected by the pressure sensors 41C-44C are input as pressure signals to the control unit 60. Pressures of the hydrogen gas in the branching first flow channels 21 are substantially equal to pressures of the hydrogen gas in the pressure accumulators 41-44 connected to the corresponding branching first flow channels 21. Accordingly, the control unit 60 uses the detection pressures of the hydrogen gas in the branching first flow channels 21 that have been detected by the pressure sensors 41C-44C as detection pressures of the hydrogen gas in the pressure accumulators 41-44.

The control unit 60 performs a gas supply control that controls a supply of the hydrogen gas from the compressor unit 30 to the pressure accumulator unit 40 and a supply of the hydrogen gas from the pressure accumulator unit 40 to the dispenser 2. The gas supply control includes a flow control that controls operations of the inflow side opening/closing valves 41A-44A and the outflow side opening/closing valves 41B-44B of the pressure accumulator unit 40 on the basis of the filling protocol of the dispenser 2 and the detection pressures of the pressure sensors 41C-44C and an operation control that controls driving of the electric motor 33 on the basis of the detection pressures of the pressure sensors 41C-44C.

In the flow control in this embodiment, at the start of supplying the vehicle 100 through the dispenser 2 with the hydrogen gas, the control unit 60 allows the outflow side opening/closing valves 41B, 42B corresponding to the two pressure accumulators 41, 42 of the pressure accumulators 41-44 to open to supply the dispenser 2 with the hydrogen gas on the basis of the filling protocol of the dispenser 2. During this time, the inflow side opening/closing valves 41A-44A of the pressure accumulators 41-44 are closed. On the other hand, when pressures in the pressure accumulators 41, 42 decrease according as the hydrogen gas is supplied from the pressure accumulators 41, 42, and these pressures become equal to or fall below a predetermined value, the control unit 60 allows the outflow side opening/closing valves 41B, 42B to close and allows the outflow side opening/closing valve 43B of the pressure accumulator 43 to open. Thereby, the supply of the hydrogen gas from the pressure accumulators 41, 42 to the dispenser 2 stops, and the supply of the hydrogen gas stored in the pressure accumulator 43 to the dispenser 2 starts. Then, when a pressure in the pressure accumulator 43 decreases according as the hydrogen gas is supplied from the pressure accumulator 43, and this pressure becomes equal to or falls below a predetermined value, the control unit 60 allows the outflow side opening/closing valve 43B to close and allows the outflow side opening/closing valve 44B of the pressure accumulator 44 to open. Thereby, the supply of the hydrogen gas from the pressure accumulator 43 to the dispenser 2 stops, and the supply of the hydrogen gas stored in the pressure accumulator 44 to the dispenser 2 starts.

On the other hand, in the flow control, after the supply of the hydrogen gas from the dispenser 2 to the vehicle 100 ends, when pressures in the pressure accumulators 41-44, namely detection pressures, become equal to or fall below a predetermined value, the control unit 60 allows the inflow side opening/closing valves 41A-44A to open and allows the compressor unit 30 to perform driving to supply the compressed hydrogen gas to the pressure accumulators 41-44. The operation control controls driving of the electric motor 33 of the compressor unit 30 during this supply of the hydrogen gas to the pressure accumulators 41-44. Hereinafter, the operation control will be described in detail.

As the electric motor 33, a so-called torque motor that is controlled by a constant torque control is employed. Further, as the electric motor 33 in this embodiment, a motor providing a smaller motive power in comparison with a conventional electric motor providing a large motive power as illustrated in FIG. 6B is employed.

As indicated by the solid line in the graph of FIG. 2, according to an output characteristic of the electric motor 33, a rated torque can be maintained against a change of a rotational speed in a standard rotation region SR that is a rotation region at or below a standard speed BN that is a maximum speed in which rotation can be made at the rated torque. Meanwhile, according to an output characteristic of the electric motor 33, an output torque, which is a maximum torque that can be output by the electric motor 33 while the motive power of the electric motor 33 is at a first upper limit value that is such a value that the motive power of the electric motor 33 is maximum, decreases according as the rotational speed increases in an overspeed region PR that is a rotation region continuous from the standard rotation region SR and above the standard speed BN.

Figure 2:
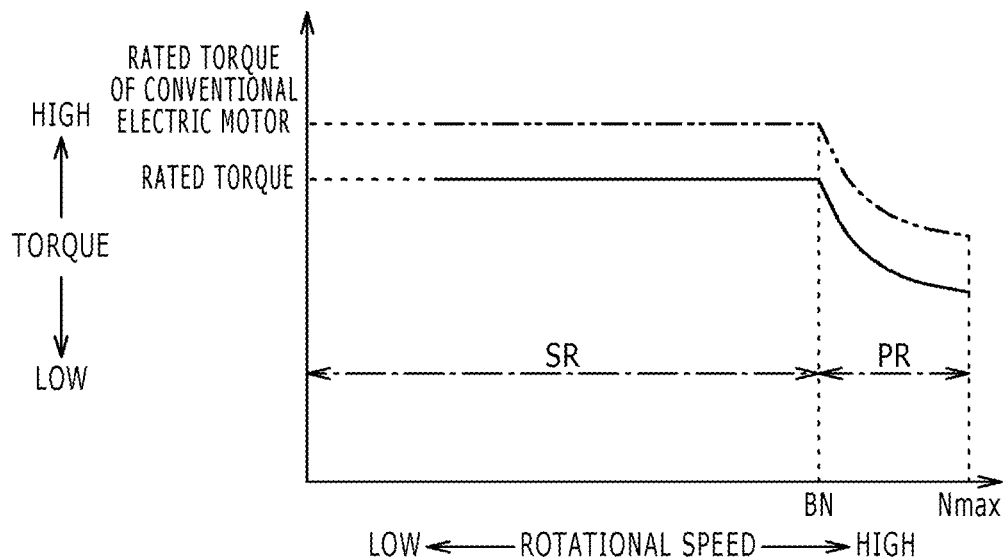
FIG. 2 is a graph illustrating a relationship between a torque and a rotational speed with respect to an electric motor of the compressor unit.

Moreover, the rated torque of the electric motor 33 is smaller than a rated torque of a conventional electric motor as indicated by a two-dot dash line in FIG. 2. Further, a torque of the electric motor 33 in the overspeed region PR is smaller than a torque of a conventional electric motor in an overspeed region as indicated by a two-dot dash line in FIG. 2. Meanwhile, the standard rotation region SR, the standard speed BN, and the overspeed region PR of the electric motor 33 are identical to a standard rotation region, a standard speed, and the overspeed region of a conventional electric motor, respectively.

In the electric motor 33 having such output characteristics, the control unit 60 controls the electric motor 33 in the operation control such that a frequency in which the motive power of the electric motor 33 is maintained at the first upper limit value increases to effectively use the motive power.

Next, the control of the electric motor 33 as described above will be described with reference to the graph of FIG. 3.

Note that, in the below description, a case in which the compressor unit 30 supplies the hydrogen gas from a state in which the hydrogen gas is not stored in the pressure accumulator 41 to a state in which the pressure accumulator 41 reaches a storage upper limit will be described. Note that a pressure in the pressure accumulator 41 in which the pressure accumulator 41 reaches the storage upper limit, namely a predetermined pressure, will be referred to as set pressure PC.

When a pressure in the pressure accumulator 41 is low, a torque required for the electric motor 33 is low. Consequently, the control unit 60 performs an overspeed operation control for allowing the electric motor 33 to perform driving at the rotational speed thereof in the overspeed region PR within a range in which the motive power of the electric motor 33 is below the first upper limit value. In the graph of FIG. 3, the control unit 60 can perform the overspeed operation control, in a storage process in which the compression section 31 stores with the hydrogen gas until the pressure in the pressure accumulator 41 reaches the set pressure PC, within a range, which is a part of this storage process, in which the pressure in the pressure accumulator 41 is below a second pressure P2 that is a threshold value. Note that the threshold value refers to the pressure in the pressure accumulator 41 when the torque required for driving of the electric motor 33 reaches the rated torque of the electric motor 33.

In particular, in a further low pressure region within the range in which the pressure in the pressure accumulator 41 is below the second pressure P2, the control unit 60 can allow the electric motor 33 to perform driving at a maximum rotational speed within the range in which the motive power of the electric motor 33 is below the first upper limit value. In other words, the control unit 60 performs a maximum speed maintaining control for allowing the electric motor 33 to perform driving at a maximum speed Nmax in the overspeed region PR. In the graph of FIG. 3, the control unit 60 can perform the maximum speed maintaining control within a range in which the pressure in the pressure accumulator 41 is lower than or equal to a first pressure P1 (P1<P2).

Figure 3:
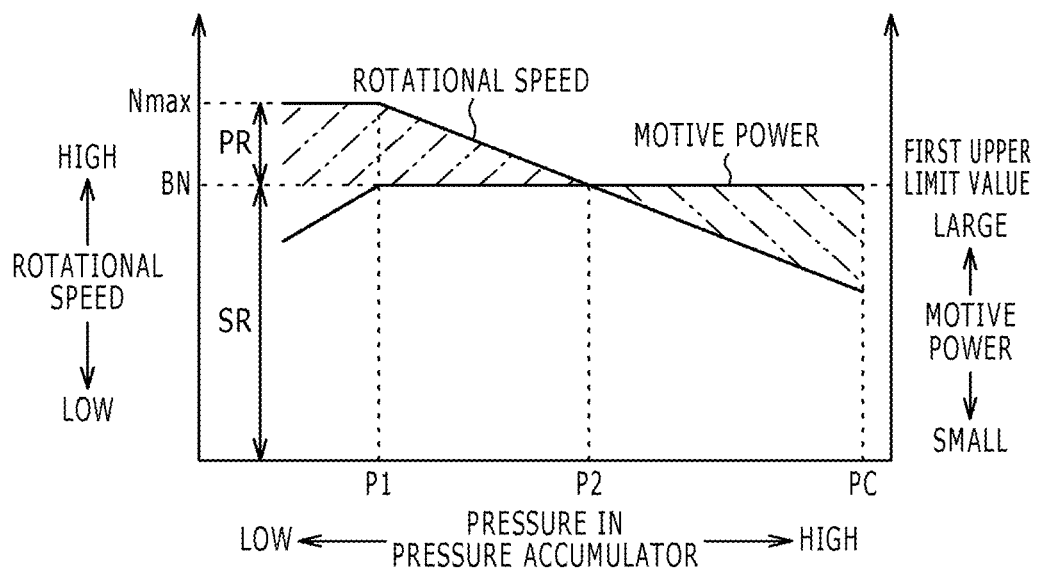
FIG. 3 is a graph illustrating a relationship among a rotational speed, a pressure in a pressure accumulator, and a motive power with respect to an electric motor of the compressor unit.

Moreover, as illustrated in the graph of FIG. 3, within a range in which the pressure in the pressure accumulator 41 is above the first pressure P1 and below the second pressure P2, the control unit 60 performs a speed change control in which the rotational speed of the electric motor 33 is decreased according as the pressure in the pressure accumulator 41 increases, thereby maintaining the motive power at the first upper limit value. As described above, the overspeed operation control includes the maximum speed maintaining control and the speed change control.

Figure 6A:
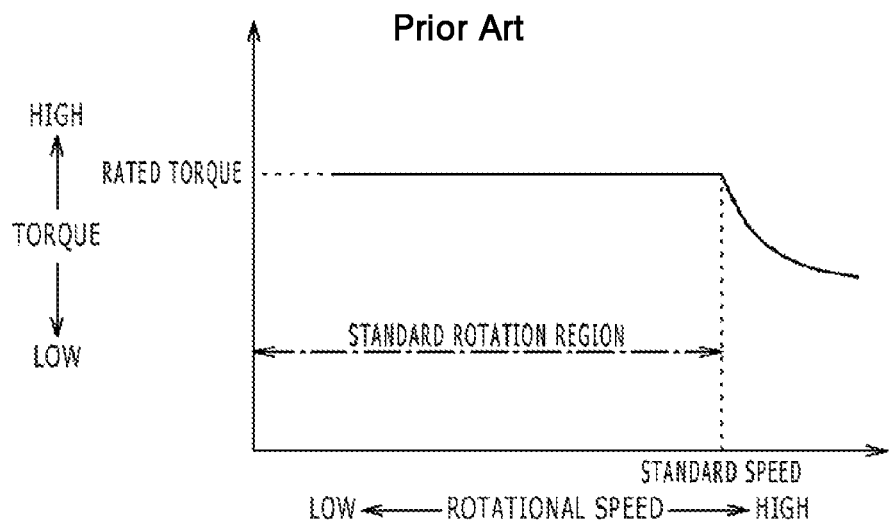
FIG. 6A is a graph illustrating a relationship between a torque and a rotational speed with respect to a conventional electric motor for driving a compression section of a compressor unit.
Figure 6B:
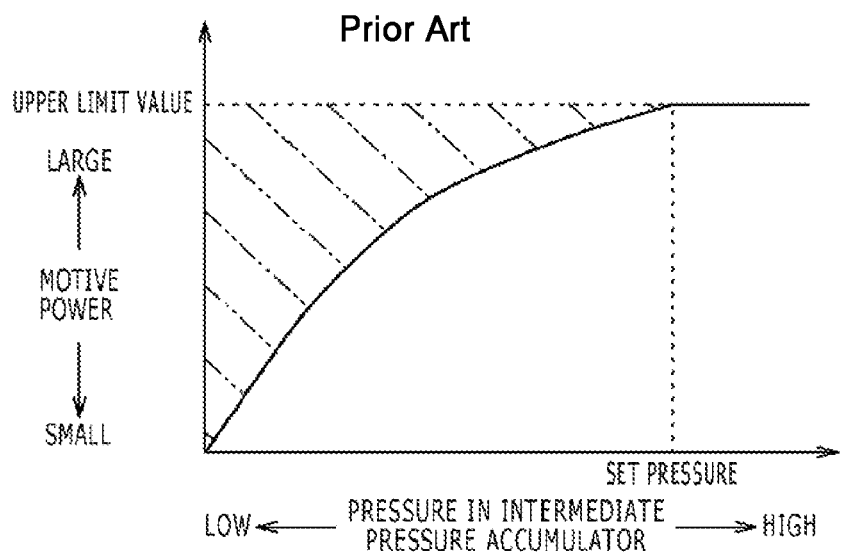
FIG. 6B is a graph illustrating a relationship between a pressure in an intermediate pressure accumulator and a motive power with respect to the conventional electric motor for driving the compression section of the compressor unit.

Moreover, as illustrated in the graph of FIG. 3, when the pressure in the pressure accumulator 41 is equal to the second pressure P2, the control unit 60 performs a normal operation control that is a control similar to a control of a conventional electric motor providing a large motive power as illustrated in FIG. 6 in which the electric motor 33 is controlled such that the rotational speed of the electric motor 33 is equal to the standard speed BN.

Then, as illustrated in the graph of FIG. 3, when the pressure in the pressure accumulator 41 is above the second pressure P2, the control unit 60 performs a low speed operation control for allowing the electric motor 33 to perform driving at the rotational speed below the standard speed BN. In the low speed operation control in this embodiment, the rotational speed of the electric motor 33 is decreased according as the pressure in the pressure accumulator 41 increases, while the motive power of the electric motor 33 is maintained at the first upper limit value. This low speed operation control is performed within a range in which the pressure in the pressure accumulator 41 ranges from the second pressure P2 to the set pressure PC. Note that such controls of the electric motor 33 as described above is also similarly performed when the hydrogen gas is supplied to the pressure accumulators 42-44.

Figure 4:
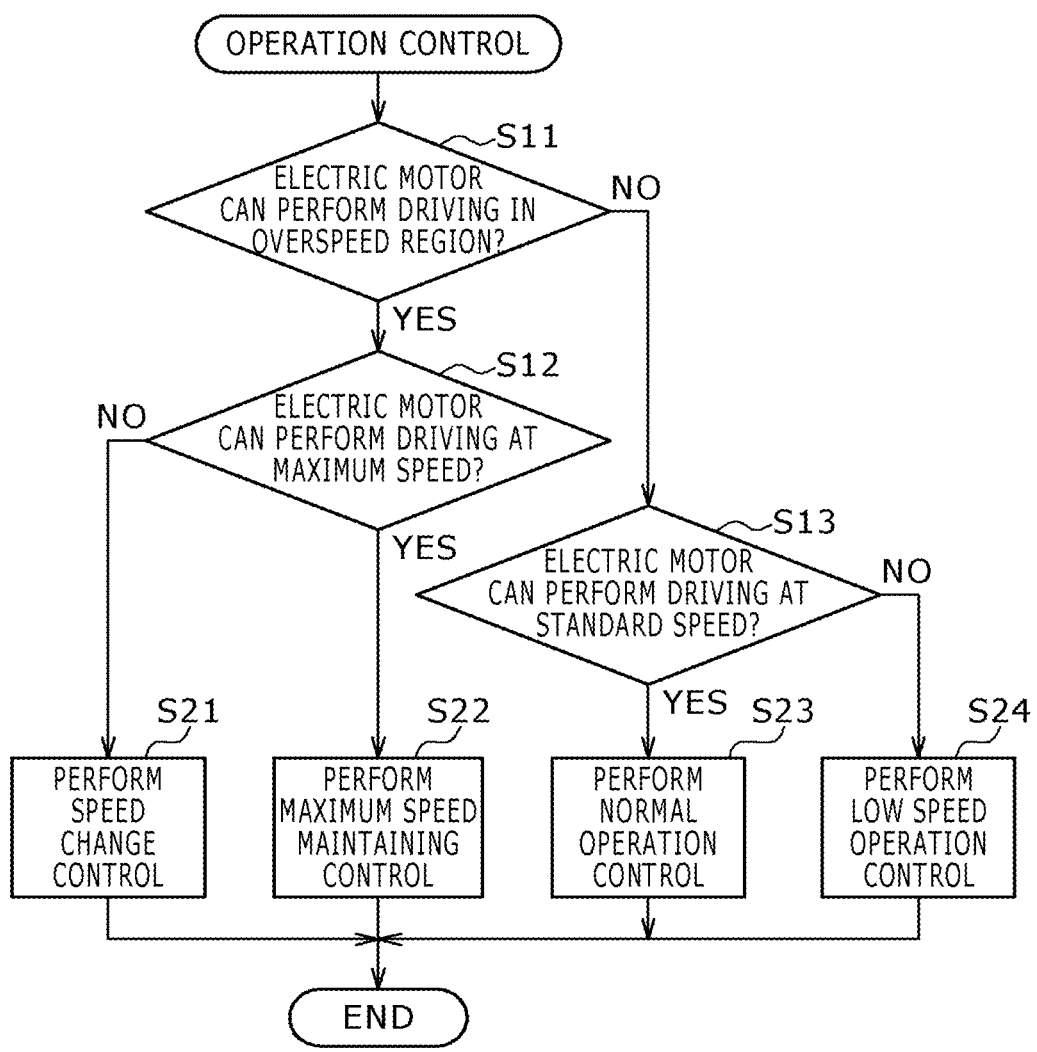
FIG. 4 is a flowchart illustrating a processing procedure of an operation control performed by the compressor unit.

Then, the control unit 60 performs such switching of the operation control as described above in accordance with the flowchart of the operation control as illustrated in FIG. 4. Note that the operation control is repeatedly performed over a period in which the hydrogen gas is supplied to the pressure accumulators 41-44. In the below description, an embodiment in which the hydrogen gas is supplied to the pressure accumulator 41 will be described, while the operation control is performed in a similar processing order with respect to the pressure accumulators 42-44 as well.

First, the control unit 60 determines in step S11 whether or not the electric motor 33 can perform driving in the overspeed region PR. In other words, in step S11, whether or not the control unit 60 can perform the overspeed operation control is determined. This determination is performed based on, for example, whether or not the pressure in the pressure accumulator 41 (detection pressure) is below the second pressure P2. In detail, the control unit 60 determines that the electric motor 33 fails to perform driving in the overspeed region PR when the detection pressure is higher than or equal to the second pressure P2, and determines that the electric motor 33 can perform driving in the overspeed region PR when the detection pressure is below the second pressure P2.

Here, when the control unit 60 determines that the electric motor 33 can perform driving in the overspeed region PR (step S11: YES), in other words, determines that the overspeed operation control can be performed, the control unit 60 determines in step S12 whether or not the electric motor 33 can perform driving at the maximum speed Nmax in the overspeed region PR. This determination is performed based on, for example, whether or not the pressure in the pressure accumulator 41 (detection pressure) is lower than or equal to the first pressure P1. In detail, the control unit 60 determines that the electric motor 33 fails to perform driving at the maximum speed Nmax when the detection pressure is above the first pressure P1, and determines that the electric motor 33 can perform driving at the maximum speed Nmax when the detection pressure is lower than or equal to the first pressure P1.

Then, when the control unit 60 determines that the electric motor 33 can perform driving at the maximum speed Nmax (step S12: YES), the control unit 60 performs the maximum speed maintaining control in step S22. On the other hand, when the control unit 60 determines that the electric motor 33 fails to perform driving at the maximum speed Nmax (step S12: NO), the control unit 60 performs the speed change control in step S21.

Moreover, when the control unit 60 determines in step S11 that the electric motor 33 fails to perform driving in the overspeed region PR (step S11: NO), in other words, determines that the overspeed operation control fails to be performed, the control unit 60 determines in step S13 whether or not the electric motor 33 can maintain the standard speed BN.

Here, when the control unit 60 determines that the electric motor 33 can maintain the standard speed BN (step S13: YES), the control unit 60 performs the normal operation control in step S23. On the other hand, when the control unit 60 determines that the electric motor 33 fails to maintain the standard speed BN (step S13: NO), the control unit 60 performs the low speed operation control in step S24.

Next, effects produced by the gas supply apparatus 10 according to this embodiment will be described with reference to FIG. 3.

An amount of processing in which the compressor unit 30 compresses the hydrogen gas and discharges the same to the pressure accumulator 41 is proportional to the rotational speed of the electric motor 33. In other words, as the rotational speed of the electric motor 33 increases, the amount of the hydrogen gas processed by the compressor unit 30 increases.

When the pressure in the pressure accumulator 41 is below the second pressure P2, in other words, while the pressure in the pressure accumulator 41 is low, the control unit 60 performs the overspeed operation control so that the electric motor 33 performs driving at the rotational speed above the standard speed BN. Accordingly, the amount of the hydrogen gas processed by the compressor unit 30 becomes larger than the amount of the hydrogen gas processed when the electric motor 33 performs driving at the standard speed BN. Consequently, as indicated by the left shaded portion in FIG. 3, while the pressure in the pressure accumulator 41 is low, the amount of the hydrogen gas processed becomes larger in comparison with a case in which constant rotation is made at the standard speed as a conventional electric motor.

In particular, when the pressure in the pressure accumulator 41 is lower than or equal to the first pressure P1, the control unit 60 performs the maximum speed maintaining control and the electric motor 33 thereby keeps performing driving at the maximum speed Nmax in the overspeed region PR so that the amount of the hydrogen gas processed by the compressor unit 30 becomes further large.

Moreover, when the pressure in the pressure accumulator 41 is above the first pressure P1 and below the second pressure P2, the control unit 60 performs the speed change control so that the electric motor 33 performs driving such that the rotational speed of the electric motor 33 is as high as possible within a range in which the motive power can be maintained at the first upper limit value. Consequently, the amount of the hydrogen gas processed by the compressor unit 30 is maximized within a range of the motive power of the electric motor 33.

Moreover, when the pressure in the pressure accumulator 41 is equal to the second pressure P2, the control unit 60 performs the normal operation control so that the electric motor 33 performs driving at the standard speed BN.

On the other hand, when the pressure in the pressure accumulator 41 above the second pressure P2, the control unit 60 performs the low speed operation control so that the rotational speed of the electric motor 33 as rotational speed capable of maintaining the rated torque falls below the standard speed BN. Accordingly, when the pressure in the pressure accumulator 41 above the second pressure P2, the amount of the hydrogen gas processed by the compressor unit 30 becomes smaller in comparison with a case in which a conventional electric motor providing a large motive power is employed.

However, in this embodiment, configuration is made such that an increased amount of the hydrogen gas processed when the pressure in the pressure accumulator 41 is below the second pressure P2, which corresponds to the area of the left shaded portion in FIG. 3, and a decreased amount of the hydrogen gas processed when the pressure in the pressure accumulator 41 is above the second pressure P2, which corresponds to the area of the right shaded portion in FIG. 3, are substantially equal to each other. Accordingly, time until the hydrogen gas is stored by the compressor unit 30 such that the pressure in the pressure accumulator 41 becomes equal to the set pressure PC is substantially equal to time in a case in which a conventional electric motor providing a large motive power is employed. Note that effects produced by the pressure accumulator 41 are described above, while similar effects are produced by the pressure accumulators 42-44 as well.

As described above, even though the motive power of the electric motor 33 is smaller than a motive power of a conventional electric motor, a decrease of the amount of the hydrogen gas processed can be suppressed. Accordingly, the electric motor 33 can be miniaturized in comparison with a conventional electric motor so that miniaturization of the gas supply apparatus 10 can be designed. In addition, miniaturization of the electric motor 33 enables reduction of a material cost, therefore, the electric motor 33 can be manufactured at low cost in comparison with a conventional electric motor. Accordingly, reduction of a cost of the gas supply apparatus 10 can be designed.

According to the gas supply apparatus 10 according to this embodiment, effects as described below can be obtained.

(1) In the range in which the pressure in the pressure accumulator 41 is below the second pressure P2, the control unit 60 performs the overspeed operation control. Thereby, the electric motor is allowed to perform driving in the overspeed region PR so that the motive power of the electric motor 33 becomes large in comparison with a case in which the electric motor 33 is allowed to perform constant driving at the standard speed BN. In other words, within a range of the motive power that can be driven by the electric motor 33, a range of the motive power available by the electric motor 33 can be enlarged in comparison with a case in which the electric motor 33 is allowed to perform constant driving at the standard speed BN to supply the hydrogen gas until the pressure in the pressure accumulator 41 reaches the set pressure PC. Consequently, the motive power of the electric motor 33 can be efficiently used. Note that similar effects can be obtained when the compressor unit 30 supplies the pressure accumulators 42-44 with the hydrogen gas as well.

(2) A torque required for the electric motor 33 becomes high according as the pressure in the pressure accumulator 41 increases. Accordingly, the control unit 60 performs the speed change control in the range in which the pressure in the pressure accumulator 41 is above the first pressure P1 and below the second pressure P2. Thereby, in a period in which the overspeed operation control can be performed, the rotational speed of the electric motor 33 is decreased according as the pressure in the pressure accumulator 41 increases so that, even though the pressure in the pressure accumulator 41 increases, the electric motor 33 can be allowed to perform driving in the overspeed region PR within the range of the motive power that can be driven by the electric motor 33. Accordingly, a frequency in which the electric motor 33 is allowed to perform driving in the overspeed region PR increases. Note that similar effects can be obtained when the compressor unit 30 supplies the pressure accumulators 42-44 with the hydrogen gas as well.

(3) In the range in which the pressure in the pressure accumulator 41 is below the first pressure P1, the control unit 60 performs the maximum speed maintaining control. Thereby, in an environment in which the maximum speed Nmax of the electric motor 33 in the overspeed region PR can be maintained, the electric motor 33 is allowed to perform driving at the maximum speed thereof Nmax so that the hydrogen gas can be further rapidly supplied into the pressure accumulator 41 in comparison with a case in which the electric motor 33 is allowed to perform driving below the maximum speed Nmax in the overspeed region PR. Consequently, time for the storage process can be shortened. Note that similar effects can be obtained when the compressor unit 30 supplies the pressure accumulators 42-44 with the hydrogen gas as well.

(4) When the pressure in the pressure accumulator 41 is above the second pressure P2, the control unit 60 performs the low speed operation control. Thereby, even when a motor providing a small motive power is employed as the electric motor 33, a processing amount equal to that by a motor providing a large motive power can be ensured. Moreover, employing a motor providing a small motive power allows miniaturization and reduction of a cost of the compressor unit 30 to be designed. Note that similar effects can be obtained when the compressor unit 30 supplies the pressure accumulators 42-44 with the hydrogen gas as well.

(Second Embodiment)

A configuration of the gas supply apparatus 10 according to a second embodiment will be described with reference to FIG. 5. The gas supply apparatus 10 according to this embodiment uses an electric motor providing a large motive power similar to that of a conventional electric motor, and is designed such that this electric motor is allowed to perform driving in the overspeed region PR, thereby shortening time for the storage process for storing the pressure accumulators 41-44 with the hydrogen gas.

Note that constituent parts in the gas supply apparatus 10 according to the second embodiment that are common to constituent parts of the gas supply apparatus 10 according to the first embodiment will be provided with common reference numerals, and a part or the entirety of the description thereof will be omitted. Note that constituent parts of the gas supply apparatus 10 that are provided with reference numerals in the description with reference to FIG. 5 denote corresponding constituent parts of the gas supply apparatus 10 in FIG. 1.

A second upper limit value that is an upper limit value of the motive power of the electric motor 33 of the gas supply apparatus 10 according to this embodiment is greater than the first upper limit value that is the upper limit value of the motive power of the electric motor 33 according to the first embodiment, and equal to an upper limit value of the motive power of a conventional electric motor. Thus, a torque of the electric motor 33 according to this embodiment in the overspeed region PR is larger than the torque of the electric motor 33 according to the first embodiment in the overspeed region PR. Meanwhile, the standard rotation region SR, the standard speed BN, and the overspeed region PR of the electric motor 33 according to this embodiment are identical to the standard rotation region SR, the standard speed BN, and the overspeed region PR of the electric motor 33 according to the first embodiment, respectively.

As illustrated in FIG. 5, the second upper limit value of the motive power of the electric motor 33 according to this embodiment is equal to the upper limit value of the motive power of a conventional electric motor so that the control unit 60 performs the overspeed operation control over the entirety of the storage process in which the compression section 31 stores with the hydrogen gas until the pressure in the pressure accumulator 41 reaches the set pressure PC. Note that the control unit 60 stops driving of the electric motor 33 when the pressure in the pressure accumulator 41 reaches the set pressure PC.

In the electric motor 33, the motive power reaches the second upper limit value when the pressure in the pressure accumulator 41 is equal to a third pressure P3 that is above the first pressure P1 and below the second pressure P2. Thus, the control unit 60 performs the maximum speed maintaining control in a range in which the pressure in the pressure accumulator 41 is lower than or equal to the third pressure P3.

Then, when the pressure in the pressure accumulator 41 becomes larger than the third pressure P3, the control unit 60 performs the speed change control. Accordingly, the electric motor 33 performs driving such that the rotational speed of the electric motor 33 is as high as possible within a range in which the motive power of the electric motor 33 can be maintained at the second upper limit value. Consequently, an amount of the hydrogen gas processed by the compressor unit 30 is maximized within a tolerance of the motive power of the electric motor 33.

In this manner, a state in which the rotational speed of the electric motor 33 is higher than the standard speed BN is maintained over the entirety of a period in which the compressor unit 30 performs driving so that the amount of the hydrogen gas processed by the compressor unit 30 is larger than a case in which an electric motor providing a motive power identical to that of a conventional electric motor is employed. Thus, time until the pressure in the pressure accumulator 41 reaches the set pressure PC can be shortened.

According to the gas supply apparatus 10 according to this embodiment, effects as described below can be obtained in addition to the effects as described in (1)-(4) according to the first embodiment.

(5) The control unit 60 performs the overspeed operation control over the entirety of the period in which the compressor unit 30 performs driving. Thereby, the rotational speed of the electric motor 33 is higher in comparison with a case in which it is assumed that the electric motor 33 is allowed to perform driving at the standard speed BN over the entirety of the period in which the compressor unit 30 performs driving, so that, if the pressures in the pressure accumulators 41 are identical to each other, the motive power is larger in comparison with the case in which the electric motor 33 is allowed to perform driving at the standard speed BN, and time for the storage process can be shortened. Note that similar effects can be obtained when the compressor unit 30 supplies the pressure accumulators 42-44 with the hydrogen gas as well.

Each embodiment as described above may be modified into other embodiments as described below.

In each embodiment as described above, the control unit 60 may fail to perform the maximum speed maintaining control. In other words, within a range of pressures in the pressure accumulators 41-44 in which the control unit 60 can perform the maximum speed maintaining control, the electric motor 33 may perform driving at the rotational speed below the maximum speed Nmax in the overspeed region PR. Note that, in this case, the rotational speed of the electric motor 33 is preferably higher than or equal to the standard speed BN.

In the speed change control according to each embodiment as described above, the electric motor 33 may perform driving with the motive power below the upper limit value (the first upper limit value or the second upper limit value). In this case, the rotational speed of the electric motor 33 is lower in comparison with a case in which the motive power of the electric motor 33 is at the upper limit value. Note that, in this case, the rotational speed of the electric motor 33 is preferably higher than or equal to the standard speed BN.

In the first embodiment as described above, the normal operation control may be omitted, and the low speed operation control may be performed when the pressures in the pressure accumulators 41-44 are higher than or equal to the second pressure P2.

In the low speed operation control according to first embodiment as described above, the electric motor 33 may perform driving with the motive power below the first upper limit value. In this case, the rotational speed of the electric motor 33 is lower in comparison with a case in which the motive power of the electric motor 33 is at the first upper limit value. Note that the rotational speed of the electric motor 33 is preferably such rotational speed that a decrease in amount of the processed hydrogen gas in a range in which the pressures in the pressure accumulators 41-44 are above the second pressure P2, which corresponds to the area of the right shaded portion in FIG. 3 is not excessively large relative to an increase in amount of the processed hydrogen gas in a range in which the pressures in the pressure accumulators 41-44 are below the second pressure P2, which corresponds to the area of the left shaded portion in FIG. 3.

In the second embodiment as described above, the control unit 60 may perform the overspeed operation control only in a range in which the pressures in the pressure accumulators 41-44 are high, or in a range in which the pressures in the pressure accumulators 41-44 are low. In short, the control unit 60 may perform the overspeed operation control only in a part of a range of the pressures in the pressure accumulators 41-44.

In the compressor unit 30 according to each embodiment as described above, the compression section 31 may perform two-to-four-stage compression or six-or-more-stage compression.

In the gas supply apparatus 10 according to each embodiment as described above, the number of the pressure accumulators may be one to three or more than five.

The gas supply apparatus 10 according to each embodiment as described above may be configured such that, in place of the control unit 60, the compressor unit 30 includes a control unit exclusively for controlling the electric motor 33 of the compressor unit 30.

In the gas supply apparatus 10 according to each embodiment as described above, the precool system 50 may be configured in such a manner as to cool the hydrogen gas that is about to flow into the dispenser 2.

The gas supply apparatus 10 according to each embodiment as described above may be used for filling tank-equipped apparatuses other than the vehicle 100 with the hydrogen gas. Further, the gas supply apparatus 10 may be used for supplying gases other than the hydrogen gas.

What is claimed is:
1. A compressor unit comprising:
   a compressor configured to compress a gas and store the compressed gas in a pressure accumulator;
   an electric motor driving the compressor, the electric motor being a constant torque motor providing a constant rated output torque in a standard rotation region of the electric motor, the standard rotation region being a rotation region at or below a standard speed; and
   a controller for controlling the electric motor, the controller including:
      means for maintaining a rated torque of the electric motor against a change of a rotational speed in the standard rotation region,
      means for decreasing an output torque of the electric motor from the rated torque as the rotational speed of the electric motor increases in an overspeed region, the overspeed region being a rotation region having the rotational speed above the standard speed, and means for driving the electric motor in the overspeed region based on an overspeed operation control of the controller when a pressure of the compressed gas in the pressure accumulator is less than a predetermined pressure.

2. The compressor unit according to claim 1, wherein the means for decreasing the output torque of the electric motor from the rated torque as the rotational speed of the electric motor increases in the overspeed region, decreases the rotational speed of the electric motor as the pressure in the pressure accumulator increases based on a speed change control of the controller, the overspeed operation control including the speed change control.

3. The compressor unit according to claim 2, wherein the means for driving the electric motor in the overspeed region, operates the electric motor at a maximum speed in the overspeed region before the speed change control.

4. The compressor unit according to claim 1, wherein the controller includes means for controlling the electric motor, when the pressure in the pressure accumulator is equal or greater than a threshold value, to operate the electric motor at the rotational speed lower than the standard speed based on a low speed operation control of the controller.

5. The compressor unit according to claim 1,
wherein the controller performs the overspeed operation control over the entirety of the storage process.

6. A gas supply apparatus that supplies a gas to a filling facility for filling a tank-equipped apparatus with the gas, the apparatus comprising:

the compressor unit according to claim 1; and wherein the pressure accumulator stores the gas discharged from the compressor unit.

7. The gas supply apparatus according to claim 6,
further comprising a precool system configured to cool the gas before flowing from the pressure accumulator into the filling facility.

* * * * *